United States Patent
Wietelmann

(10) Patent No.: US 9,490,482 B2
(45) Date of Patent: Nov. 8, 2016

(54) GALVANIC ELEMENTS CONTAINING OXYGEN-CONTAINING CONVERSION ELECTRODES

(76) Inventor: Ulrich Wietelmann, Friedrichsdorf (DE)

(*) Notice: Subject to any disclaimer, the term of this patent is extended or adjusted under 35 U.S.C. 154(b) by 1151 days.

(21) Appl. No.: 13/510,209

(22) PCT Filed: Nov. 18, 2010

(86) PCT No.: PCT/EP2010/067756
§ 371 (c)(1),
(2), (4) Date: May 16, 2012

(87) PCT Pub. No.: WO2011/061256
PCT Pub. Date: May 26, 2011

(65) Prior Publication Data
US 2012/0225356 A1 Sep. 6, 2012

(30) Foreign Application Priority Data
Nov. 20, 2009 (DE) .................. 10 2009 046 916

(51) Int. Cl.
| | |
|---|---|
| H01M 4/485 | (2010.01) |
| H01M 10/052 | (2010.01) |
| H01B 1/00 | (2006.01) |
| H01B 1/08 | (2006.01) |
| C01B 15/043 | (2006.01) |
| H01M 4/36 | (2006.01) |
| C01D 15/02 | (2006.01) |
| H01M 4/58 | (2010.01) |
| C01D 15/00 | (2006.01) |
| C01G 23/00 | (2006.01) |
| H01M 4/48 | (2010.01) |

(52) U.S. Cl.
CPC ............. *H01M 4/58* (2013.01); *C01D 15/00* (2013.01); *C01D 15/02* (2013.01); *C01G 23/005* (2013.01); *H01M 4/483* (2013.01); *H01M 10/052* (2013.01); *C01P 2006/40* (2013.01); *Y02E 60/122* (2013.01); *Y10T 29/49108* (2015.01)

(58) Field of Classification Search
CPC .... H01M 4/58; H01M 10/052; H01M 4/483; C01D 15/02; C01D 15/00; C01G 23/005; Y10T 29/49108; Y02E 60/122; C01P 2006/40

See application file for complete search history.

(56) References Cited

U.S. PATENT DOCUMENTS

| | | | |
|---|---|---|---|
| 4,071,665 A | 1/1978 | Garth | |
| 4,960,657 A * | 10/1990 | Masuda et al. | 429/231.95 |
| 5,057,387 A | 10/1991 | Masuda et al. | |
| 5,283,136 A | 2/1994 | Peled et al. | |
| 5,436,549 A | 7/1995 | Lundquist et al. | |
| 7,736,805 B2 * | 6/2010 | Nazri et al. | 429/218.2 |
| 2008/0199772 A1 * | 8/2008 | Amatucci et al. | 429/188 |
| 2009/0053594 A1 | 2/2009 | Johnson et al. | |
| 2009/0286141 A1 * | 11/2009 | Nakamura | 429/82 |
| 2014/0075745 A1 * | 3/2014 | Lu | H01M 4/523 29/623.1 |

FOREIGN PATENT DOCUMENTS

| | | |
|---|---|---|
| DE | 3906082 | 9/1969 |
| EP | 2 026 390 A2 | 2/2009 |
| GB | 2188917 B | 11/1989 |
| JP | S62241819 A1 | 10/1987 |
| JP | H01225063 A | 9/1989 |
| JP | 2005516347 A | 6/2005 |
| JP | 2009096707 A | 5/2009 |
| WO | 03063272 A1 | 7/2003 |
| WO | 2009040646 A2 | 4/2009 |

OTHER PUBLICATIONS

Haertiling, et al. "A literature review of reactions and kinetics of lithium hydride hydrolysis", *J. Nucl. Mater.* 349 (2006), pp. 195-233.

* cited by examiner

*Primary Examiner* — Ula C Ruddock
*Assistant Examiner* — Amanda Barrow
(74) *Attorney, Agent, or Firm* — Jeremy J. Kliebert

(57) ABSTRACT

A galvanic element containing a substantially transition metal-free oxygen-containing conversion electrode, a transition metal-containing cathode, and an aprotic lithium electrolyte. The substantially transition metal-free oxygen-containing conversion electrode materials contain lithium hydroxide and/or lithium peroxide and/or lithium oxide, and in the charged state additionally contain lithium hydride, and are contained in a galvanic element, for example a lithium battery, as the anode. Methods for producing substantially transition metal-free oxygen-containing conversion electrode materials and galvanic elements made of substantially transition metal-free oxygen-containing conversion electrode materials are also provided.

9 Claims, 4 Drawing Sheets

GALVANIC ELEMENTS CONTAINING OXYGEN-CONTAINING CONVERSION ELECTRODES

CROSS-REFERENCE TO RELATED APPLICATIONS

This application is a National Stage entry of International Application No. PCT/EP2010/067756, filed on Nov. 18, 2010, which claims priority from German Application No. 10 2009 046 916.8, filed Nov. 20, 2009.

BACKGROUND

The rechargeable lithium batteries currently used contain graphite as anode material. Graphite acts as a lithium insertion material and according to the equation $$Li+6C \rightarrow LiC_6$$

it has a theoretical capacity of 372 mAh/g with a potential of approx. 0.2 V vs $Li/Li^+$. The much higher storage capacity of lithium metal (3860 mAh/g) cannot be used in batteries suitable for practice, since batteries of this type are not safe or cycle-stable. In cycling, the lithium metal is in part not deposited in a planar manner, but in the form of growths (dendrites). These growths can be detached from the metal anode, whereby the electrochemical cell loses capacity accordingly. The consequences are even more serious if needle-shaped dendrites penetrate the separator. The battery cell can thereby be short-circuited with often catastrophic consequences: thermal run away, often accompanied by fires.

There have therefore been efforts to use lithium alloys instead of pure lithium metal as anode material. However, lithium alloys exhibit extremely strong volume fluctuations with lithium intercalation and deintercalation (in part several 100%, e.g., $Li_9Al_4$: 238%). Alloy anodes, with the exception of tin-graphite composites, have therefore not become established on the market. However, tin is a rare and expensive element, which has prevented the wide use of materials containing tin.

Tarascon and Aymard proposed an electrochemical cell in which lithium hydride is used as a negative electrode (anode) (EP 2026390A2):

$$MH_x + Li \leftrightarrow xLiH + M \qquad (1)$$

where M=La, Mg, Ni, Na, Ti

However, the Mg-based system described in detail in the above-mentioned patent specification has a marked hysteresis and it has not hitherto been possible to demonstrate its functionality in a real lithium battery.

An anode material is sought, which avoids the disadvantages of the prior art, i.e. has
A high capacity (>>372 mAh/g)
And at the same time a good reversibility
And does not contain any expensive or toxic constituents.

DETAILED DESCRIPTION

Surprisingly, it was found that galvanic cells, e.g. lithium batteries containing lithium oxygen compounds largely free of transition metals of the formulas $$Li_2O \text{ and/or } Li_2O_2 \text{ and/or } LiOH$$

have a good cycle stability in the negative mass (anode). The oxygen-containing electrode materials according to the invention in the lithium-rich state, i.e., the charged state, in addition to at least one of the cited lithium oxygen compounds, can furthermore contain lithium hydride or be composed thereof. All of the cited lithium-containing compounds largely free of transition metals are insoluble in common aprotic electrolytes (i.e. conductive media that do not have any acid hydrogen atoms) and can therefore be used in galvanic cells with such aprotic electrolytes, for example, lithium batteries. Due to their low potential compared to $Li/Li^+$ they can be preferably used as anode (negative electrode). With the use of a counterelectrode with a more negative potential than the lithium oxygen compounds largely free of transition metals, however the latter can also function as positive electrode (cathode). As counterelectrodes with a particularly negative normal potential, lithium metal as well as many lithium metal alloys (for example, lithium-silicon, lithium-tin or lithium-aluminum phases) can be considered in particular.

Suitable aprotic electrolytes can be solid, liquid or gelatinous. In particular liquid electrolytes comprising solutions of an oxidation-stable lithium salt (e.g., $LiPF_6$, $LiBF_4$, $LiBF_2C_2O_4$, $LiB(C_2O_4)_2$ (LiBOB), lithium triflate or lithium imides such as LiTFSI or LFSI) in organic solvents (e.g., carbonic ester, carbonic acid ester and/or nitriles) or ionic liquids or mixtures thereof are suitable. Particularly preferred are electrolytes that do not have any conducting salt with instable (i.e., thermo-sensitive or hydrolysis-sensitive) element fluorine compounds. For example, it is known that $LiPF_6$ when heated or in contact with water forms $PF_5$, HF and other decomposition products which can react exothermally with battery materials, for example, the lithium-oxygen compounds largely free from transition metals according to the invention. LiBOB, LiTFSI or $LiClO_4$ is therefore preferably used instead as conducting salt.

The lithium charging or discharging process of the negative electrode (anode) can be described by the following reaction equations:

$$2LiOH + 2Li \leftrightarrow Li_2O_2 + 2LiH \qquad (2)$$

$$Li_2O_2 + 2Li \leftrightarrow 2Li_2O \qquad (3)$$

The total reaction is then as follows:

$$2LiOH + 4Li \leftrightarrow 2Li_2O + 2LiH \qquad (4)$$

To the left of the reaction arrow of reaction (4) the low-lithium, fully discharged form (that is, LiOH) is shown, while to the right the fully charged form (mixture of lithium oxide and lithium hydride) is shown.

There are different possibilities for using lithium-oxygen compounds essentially free from transition metals (referred to below as "oxygen-containing conversion electrodes") as anode for galvanic cells. Thus oxygen-containing conversion electrodes in the (partially) discharged state (that is, in the form of LiOH or $Li_2O_2$, optionally in the mixture with lithium hydride) can be switched against a lithiated insertion material, for example, a lithium metal oxide $Li_nM^3O_y$. The electrode reactions, taking into consideration the fully discharged and fully charged form of the oxygen-containing conversion electrodes, then generally look like this with the use of a metal oxide cathode:

$$n/2 LiOH + Li_n M^3_y O_z \leftrightarrow n/2 Li_2 O \cdot n/2 M^3_y O_z \qquad (5)$$

According to the invention it is also possible to start from the partially discharged state of the oxygen-containing conversion electrodes according to the invention (5a) or to charge only partially (up to the stage of the peroxide) (5b):

$$n/2 Li_2O_2 + Li_nM^3{}_yO_z \leftrightarrow n/2 Li_2O + M^3{}_yO_z \quad (5a)$$

$$nLiOH + Li_nM^3{}_yO_z \leftrightarrow n/2 Li_2O + nLiH + M^3{}_yO_z \quad (5b)$$

$M^3$ is at least one redoxative metal, selected from the group Co, Ni, Mn, Fe, V, Cr, Mo, Ti, Zr or a mixture thereof;
n is a whole number between 1 and 3 and
y and z are whole numbers between 1 and 4.

The following lithium metal oxides are particularly preferred: $LiCoO_2$, $LiNiO_2$, $LiMn_2O_4$, $Li_2MnO_3$, $LiVO_2$ as well as mixed metal oxides such as $Li(Ni_{1/3}Mn_{1/3}Co_{1/3})O_2$, $Li(Ni_{0.85}Co_{0.15})O_2$, $Li(Ni_{0.85}Co_{0.1}Al_{0.05})O_2$ or $LiFe_{0.5}Mn_{1.5}O_4$.

Instead of a metal oxide, other lithium insertion materials can also be used, for example, lithium phosphates (e.g., $LiFePO_4$, $LiVPO_4$, $LiMnPO_4$), lithium silicates (e.g., $Li_2FeSiO_4$, $Li_2MnSiO_4$, $Li_2CoSiO_4$) and mixed lithiated fluorometal oxides.

If a lithium-free or a lithium-deficient cathode is to be used, the oxygen-containing conversion electrode material according to the invention is preferably used in the lithium-rich (i.e., the charged form, that is, as $Li_2O$, optionally is a mixture with LiH). Lithium insertion materials (e.g., metal oxides such as $MnO_2$, $NiO_2$ or $V_2O_5$) or conversion materials, preferably metal fluorides such as $NiF_2$, $CoF_2$, $FeF_2$ and $FeF_3$ or metal oxyfluorides such as $BiO_xF_{3-2x}$ or $FeOF$ can then be used as positive mass (cathode).

It is also possible to switch the oxygen-containing conversion electrode according to the invention in (partially) discharged form against lithium-free cathode materials. In this case it is necessary to incorporate a further lithium source. This lithium source is either pure lithium metal, for example, in powder form or a lithium metal-containing alloy. Preferably, pure lithium metal is used. Then a mixture of lithium hydride and lithium oxide and/or lithium peroxide is formally formed in situ (during the first charging process):

$$2LiOH + 2mLi \leftrightarrow mLi_2O_{2/m} + 2LiH \quad (6)$$

m=1 or 2

In the case of use of the partially discharged oxygen-containing conversion electrode material ($Li_2O_2$) according to the invention, lithium oxide is formed:

$$Li_2O_2 + 2Li \leftrightarrow 2Li_2O \quad (3)$$

The electrode redox reactions are to be formulated as follows, for example, with the use of transition metal oxides as cathode material:

$$2LiH + mLi_2O_{2/m} + M^3{}_yO_z \leftrightarrow 2LiOH + Li_{2m}M^3{}_yO_z \quad (7)$$

$$oLi_2O + M^3{}_yO_z \leftrightarrow oLi_2O_2 + Li_{2o}M^3{}_yO_z \quad (8)$$

where m, y, z: meanings see above and o=0.5, 1, 2 or 3

The theoretical gravimetric capacity of LiOH according to equation (4) is 2238 Ah/kg and thus approx. 6 times as much as that of graphite. Based on the effectively present mixture of $Li_2O$ and LiH, the theoretical capacity of the oxygen-containing conversion electrode material according to the invention is 1417 Ah/kg.

The lithium in equation (6) can also be used in excess. Then, in addition to lithium hydride, a mixture of lithium metal and lithium oxide or lithium peroxide is formed:

$$2LiOH + (2m+a)Li \rightarrow mLi_2O_{2/m} + 2LiH + aLi \quad (9)$$

a is a number between 0 and 5, preferably between 0 and 2.

With the use of transition metal oxides, for example, the general electrode redox reaction is then as follows:

$$2LiH + mLi_2O_{2/m} + M^3{}_yO_z + aLi \leftrightarrow 2LiOH + Li_{2m}M^3{}_yO_z + aLi \quad (10)$$

With the connection against a lithium-charged insertion cathode or conversion cathode, it is preferred to use the oxygen-containing conversion electrode in the discharged state, i.e., in the form of LiOH. With the use of lithium magnesiospinel, for example, as a cathode, the galvanic cell then has the following electrode configuration according to the general equation (5):

$$2LiMn_2O_4 // LiOH$$

$$LiOH + 2LiMn_2O_4 \leftrightarrow 2LiH + Li_2O + 2Mn_2O_4 \quad (5a)$$

According to the invention it is also possible to connect the discharged oxygen-containing conversion electrode free of transition metals against a mixture of lithium metal and the partially or completely lithium-free lithium insertion cathode. The configuration is then as follows, for example:

$$2Li + 2Mn_2O_4 // LiOH$$

The lithiation of the cathode material can be carried out either ex-situ (i.e., outside the galvanic cell) or in the completely assembled electrochemical cell during cycling.

With the combination of a lithium-free (or low-lithium) insertion cathode with an oxygen-containing conversion electrode according to the invention, it is preferred to use it in the charged or partially charged state. For example, the (partially) charged conversion electrode can be built up against a cathode comprising a suitable manganese dioxide modification:

$$2MnO_2 // LiH + Li_2O$$

$$LiH + Li_2O + 2MnO_2 \leftrightarrow LiOH + 2LiMnO_2 \quad (10a)$$

$$2LiH + Li_2O_2 + 2MnO_2 \leftrightarrow 2LiOH + 2LiMnO_2 \quad (10b)$$

Finally, it is possible to use a mixture of lithium hydroxide and lithium metal as well as a lithium-free (or low-lithium) transition metal oxide. Then in a first step according to equation (4) the charged anode form (an $Li_2O/LiH$ mixture) is formed. As an example, an electrode redox reaction using $NiO_2$ is shown:

$$2NiO_2 // LiH + Li_2O$$

$$LiH + Li_2O + 2NiO_2 \leftrightarrow LiOH + 2LiNiO_2 \quad (7a)$$

In the above reaction equations and electrode configurations the optimal (that is, the theoretical) stoichiometric ratios are given. However, it can also be advisable to deviate from these ratios in order, for example, to increase the mechanical electrode stability.

For example, the theoretical molar ratio with the charged oxygen-containing conversion electrode according to the invention is 2 $LiH : 2Li_2O$. If less LiH is used based on $Li_2O$, for example, only a molar ratio of 1:2, it is not possible for all lithium oxide to be converted into the discharged form, the lithium hydroxide (LiOH). Instead a part of the lithium oxide also is left after the charge in unchanged form. The electrode configuration and the charge/discharge equations then are as follows, for example, with the use of manganese dioxide as cathode:

$$2MnO_2 // LiH + 2Li_2O$$

$$LiH + 2Li_2O + 2MnO_2 \leftrightarrow LiOH + Li_2O + 2LiMnO_2 \quad (7a)$$

The lithium oxide not taking part in the redox process causes a lower volume change of the anode during cycling, i.e. it stabilizes it, so that a further improved cycle stability is achieved.

If the oxygen-containing conversion electrode material according to the invention is used in the charged state, the molar ratio between LiH and Li$_2$O can have values between 0.1:1 to 10:1. In a similar manner, the molar ratio between LiOH and Li metal can have values between 1:1 to 1:20.

The oxygen-containing conversion electrode material according to the invention can be used in the fully discharged form (that is, as LiOH) or also in a mixture with lithium oxide and/or lithium peroxide and/or LiH. In general, molar ratios according to the invention between LiOH, Li$_2$O, Li$_2$O$_2$ and LiH are in the range between 1:0:0:0 and 1:0.1-2:0.1-2:0.1-12.

The oxygen-containing conversion electrode material according to the invention is preferably present in powder form. In general the particles are <100 μm in size, particularly preferably <30 μm. Preferably additives improving conductivity, for example graphite, conductive carbon black or finely distributed metals (e.g., Ti powder) are added to the oxygen-containing conversion electrode material. Particularly preferably the additive improving conductivity is ground with the oxygen-containing conversion electrode material, for example, in a ball mill or bar mill.

Within the meaning of the invention it is possible to replace part of the lithium by a different element of the first or second main group of the periodic system. For example, it is possible to use a mixture of lithium hydroxide and magnesium hydroxide. Since the tramp metal reduces the storage capacity, the proportion thereof should not be selected too high. Preferably, the lithium proportion based on the total metal content of the oxygen-containing conversion electrode material according to the invention is at least 80 mol % preferably at least 90 mol % and particularly preferably at least 95 mol %.

The production of the discharged oxygen-containing conversion electrode material is carried out according to the prior art, for example, by caustification of lithium carbonate with burnt lime or slaked lime:

$$Li_2CO_3 + Ca(OH)_2 \rightarrow 2LiOH + CaCO_3\downarrow \quad (11)$$

Lithium peroxide is obtained by conversion of lithium hydroxide with hydrogen peroxide according to:

$$2LiOH + H_2O_2 \rightarrow Li_2O_2 + 2H_2O \quad (12)$$

Lithium oxide can be produced by thermal decomposition of lithium peroxide at temperatures above approx. 190° C.

$$2Li_2O_2 \rightarrow 2Li_2O + O_2 \quad (13)$$

or by conversion of lithium hydride with lithium hydroxide at temperatures above 200° C., particularly preferably >250° C.:

$$LiH + LiOH \rightarrow Li_2O + H_2 \quad (14)$$

Furthermore, lithium oxide can be produced by conversion of lithium peroxide with lithium metal according to $$2Li + Li_2O_2 \rightarrow 2Li_2O \quad (15)$$

at temperatures above the lithium melting point, preferably above 300° C. in the solid mixture in a closed, pressure-proof vessel.

Finally, a mixture of lithium hydride and lithium oxide can be produced by separate production of the two lithium compounds and subsequent mixture. It can also be synthesized by reaction between lithium hydroxide and lithium metal according to $$2Li + LiOH \rightarrow LiH + Li_2O \quad (16)$$

either in substance, i.e., free of solvents, or as a dispersion in a high-boiling solvent, preferably liquid paraffin, at temperatures of 180 to 300° C. Preferably this conversion can be carried out under milling conditions, i.e., with the use of a mill.

Finally, mixtures of lithium hydroxide and lithium oxide can be produced by conversion of a powder mixture comprising equimolar amounts of lithium hydride and lithium peroxide at temperatures above 200° C., preferably above 250° C.:

$$LiH + Li_2O_2 \rightarrow LiOH + Li_2O \quad (17)$$

Use of an oxygen-containing conversion electrode material containing lithium hydroxide and/or lithium peroxide and/or lithium oxide as well as in the charged state in addition lithium hydride as negative electrode (anode) in a galvanic cell, for example, a lithium battery.

Galvanic cell, containing an oxygen-containing conversion electrode essentially free from transition metal, is a transition metal-containing cathode and an aprotic lithium electrolyte.

Use of an electrode containing a lithium-oxygen compound largely free from transition metal as a positive mass (cathode) with the use of a counterelectrode with a more negative potential (for example, lithium metal or a lithium metal alloy).

In detail, the invention relates to:
  A galvanic cell in which the oxygen-containing conversion electrode in the discharged state contains lithium hydroxide and/or lithium peroxide or is composed thereof.
  A galvanic cell in which the oxygen-containing conversion electrode in the charged state contains lithium hydride.
  A galvanic cell in which a lithium insertion material or a conversion material is used as cathode (positive mass).
  A galvanic cell in which a lithium metal oxide, a lithiated phosphate, a lithiated silicate or a mixed lithiated fluorometal oxide is used as lithium insertion material and transition metal fluoride or transition metal oxyfluoride is used as a conversion material.
  A method for producing a lithium battery in which an oxygen-containing conversion electrode containing lithium hydroxide and/or lithium peroxide and/or lithium oxide as well as in the charged state in addition lithium hydride is brought into contact with a cathode containing a lithium insertion material or a conversion material by a separator/electrolyte compound.
  A method in which the lithium insertion material is a lithium metal oxide, a lithium phosphate a lithium silicate or a lithiated fluorometal oxide and that the conversion electrode material is a transition metal fluoride or a transition metal oxyfluoride.
  A method for producing a lithium battery in which an anode containing a mixture of lithium hydride and lithium oxide and/or lithium peroxide is brought into contact with a partially or fully delithiated or lithium-free cathode containing a lithium insertion material or a conversion material by a separator/electrolyte compound.
  A method in which the lithium insertion material is a lithium metal oxide, a lithium phosphate, a lithium silicate or a lithiated fluorometal oxide or a mixture from the cited substance groups and that the conversion material is a transition metal fluoride or a transition metal oxyfluoride.

A method in which an anode containing a mixture of lithium hydroxide and/or lithium peroxide is brought into contact with a partially or fully lithiated cathode containing a lithium insertion material or a conversion material by a separator/electrolyte compound.

A negative mass for a galvanic cell that contains lithium hydroxide and/or lithium peroxide and/or lithium oxide and in the charged state in addition lithium hydride or is composed thereof.

A negative mass for a galvanic cell that contains additives improving conductivity, for example, graphite or conductive carbon black.

The use of lithium hydroxide and/or lithium peroxide and/or lithium oxide optionally in a mixture with lithium hydride as negative electrode (anode) in a galvanic cell, for example, a lithium battery.

The production of a mixture of lithium hydride and $Li_2O$ for use in a galvanic cell by conversion of lithium hydroxide with lithium metal either in substance, i.e., solvent-free or as a dispersion in a high-boiling solvent (e.g., liquid paraffin) at increased temperatures, preferably under milling conditions.

The production of a mixture of lithium hydroxide and $Li_2O$ for use in a galvanic cell by conversion of lithium hydride with lithium peroxide either in substance, i.e. solvent-free or as a dispersion in a high-boiling solvent (e.g. liquid paraffin) at increased temperatures, preferably under milling conditions.

The production of lithium oxide by conversion of lithium hydride with lithium hydroxide at temperatures above 200° C., preferably above 250° C.

The production of lithium oxide by conversion of lithium metal with lithium peroxide at temperatures above the lithium melting point, preferably above 300° C. in a closed, pressure-proof vessel.

The invention is described in more detail below based on five examples and four figures.

They show:

EXAMPLE 1

Figure 1:
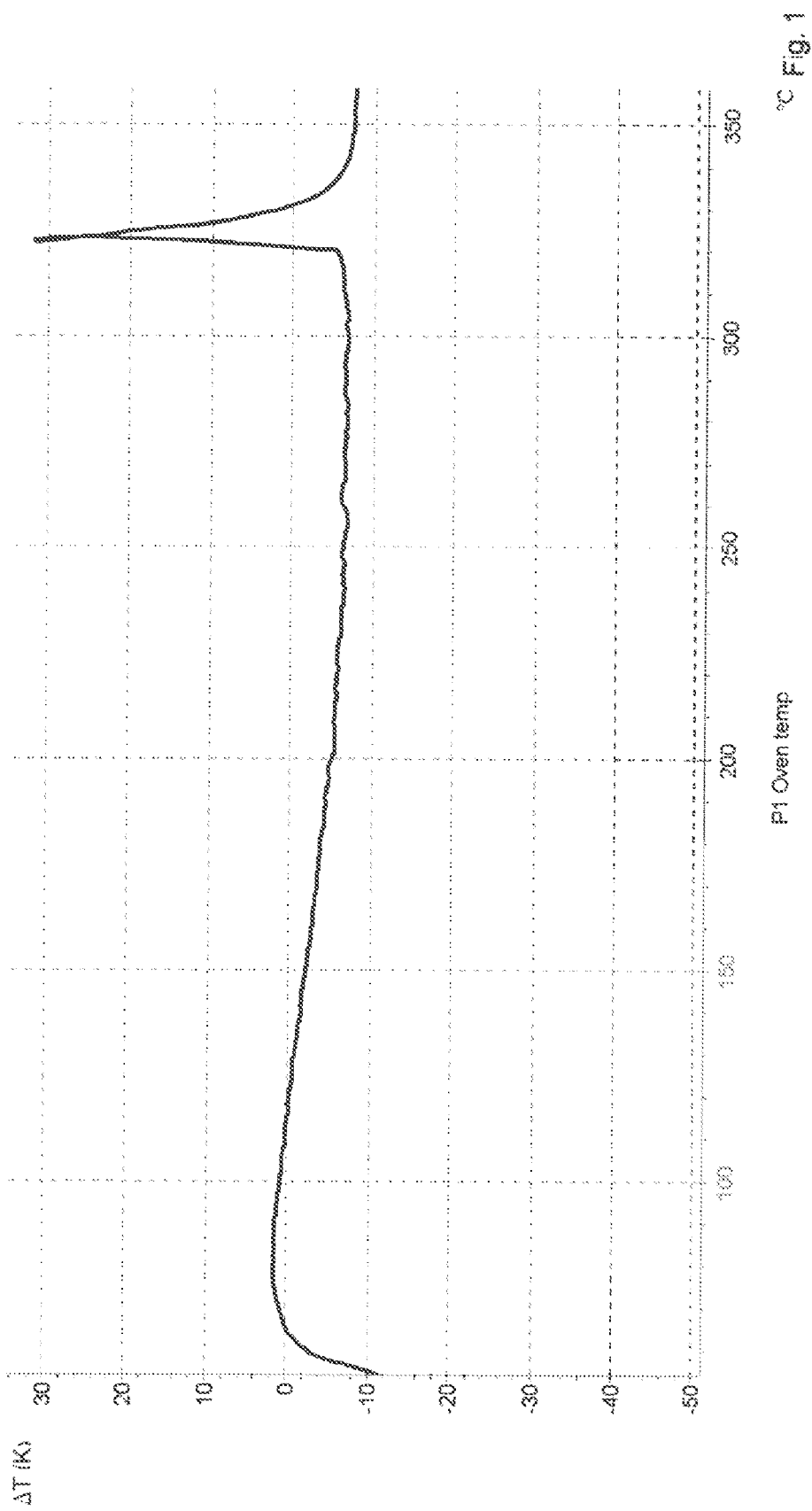
FIG. 1—DSC diagram for the production according to example 2

Production of Lithium Oxide by Conversion of Lithium Hydride with Lithium Hydroxide In an argon (Ar) filled glove box a mixture composed of respectively 50 mmol lithium hydride (0.40 g) and anhydrous lithium hydroxide (1.20 g) is mixed and pulverized in an agate mortar and then filled into a steel autoclave with a capacity of approx. 5 ml and a pressure indicator and heated with a heating rate of 45 K/h to 360° C. When approx. 200° C. is exceeded, the start of a gas formation is observed. At the end of the experiment a pressure of 25 bar has developed.

The autoclave is cooled to room temperature and the white powder obtained is tested by means of x-ray diffractometry. It is composed essentially of lithium oxide in addition to traces of remaining educts.

EXAMPLE 2

Production of Lithium Oxide by Conversion of Lithium Metal with Lithium Peroxide In an Ar-filled glove box a mixture composed of 60 mmol lithium metal powder (0.42 g) and 30 mmol lithium peroxide (1.38 g) is mixed and pulverized in an agate mortar and then filled into a steel autoclave with a capacity of approx. 5 ml with a pressure and temperature indicator and heated with a heating rate of 45 K/h to 360° C.

When approx. 310° C. is exceeded, the exotherm of the desired conversion in FIG. 1 is discerned.

The reaction product was tested after cooling to room temperature by means of XRD. It is composed of phase pure $Li_2O$.

EXAMPLE 3

Production of a Mixture of Lithium Hydride and Lithium Oxide by Conversion of Lithium Metal with Lithium Hydroxide In an Ar-filled glove box a mixture composed of 80 mmol lithium metal powder (0.56 g) and 40 mmol anhydrous lithium hydroxide (0.96 g) is mixed and pulverized in an agate mortar and then filled into a steel autoclave with a capacity of approx. 5 ml and a pressure and temperature indicator and heated with a heating rate of 45 K/h to 360° C.

Figure 2:
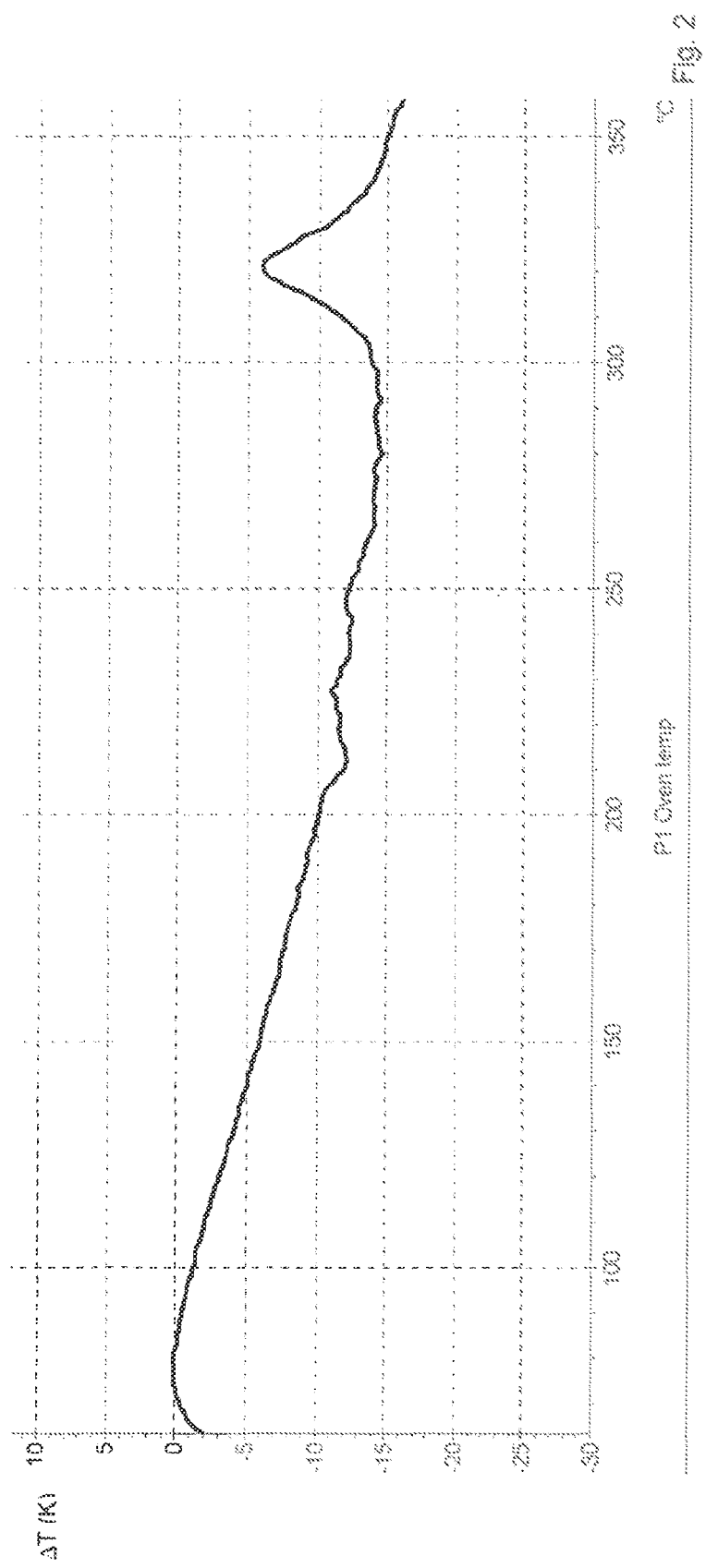
FIG. 2—DSC diagram for the production according to example 3

When approx. 300° C. is exceeded, the exotherm of the desired conversion in FIG. 2 is discernible.

The reaction product was tested by means of XRD after cooling to room temperature. It is composed of $L_{i2}O$ and LiH in addition to slight residues of LiOH.

EXAMPLE 4

Production of a Mixture of Lithium Hydroxide and Lithium Oxide by Conversion of Lithium Hydride with Lithium Peroxide In an Ar-filled glove box a mixture comprising respectively 45 mmol lithium hydride (0.36 g) and 45 mmol lithium peroxide (2.06 g) is mixed and pulverized in an agate mortar and then filled into a steel autoclave with a capacity of approx. 5 ml with pressure and temperature indicator and heated with a heating rate of 45 K/h to 360° C.

Figure 3:
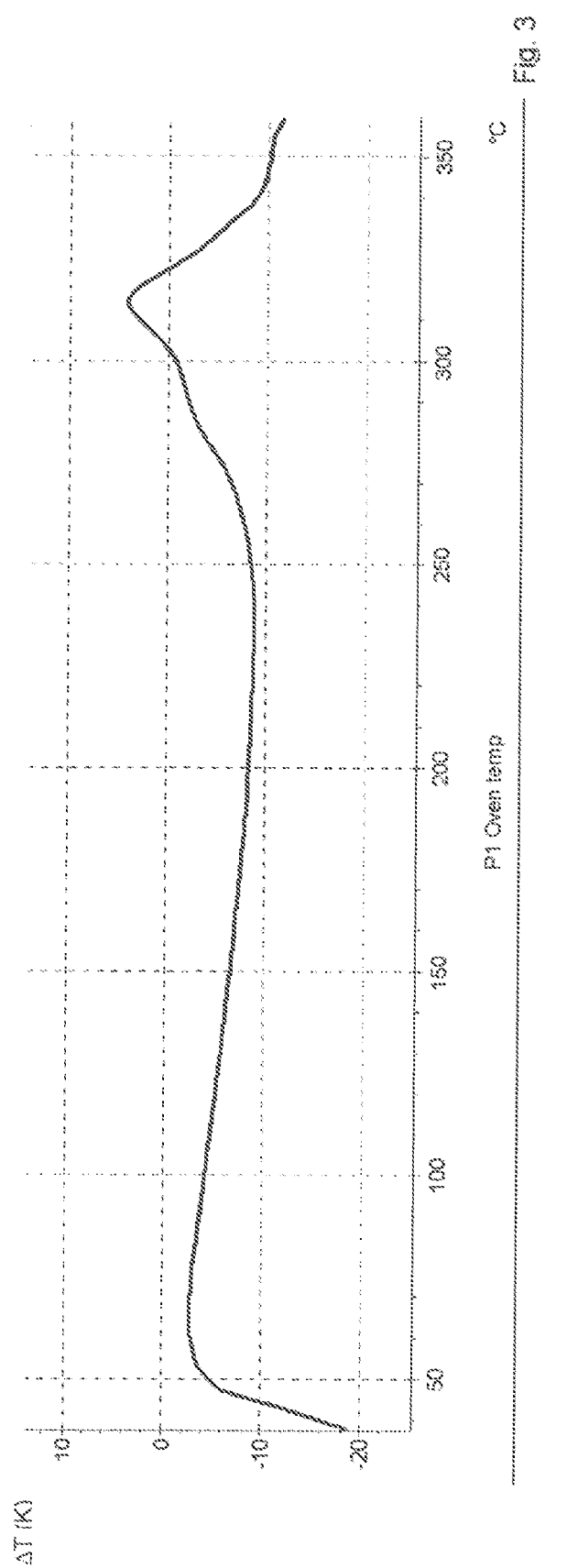
FIG. 3—DSC diagram for the production according to example 4

When approx. 200° C. is exceeded, a broad exotherm with peaks at 290 and 310° C. is discerned in FIG. 3.

The expected reflexes of lithium oxide and lithium hydroxide can be identified by XRD in the cooled product, however, the reflexes of LiH and $Li_2O_2$ can no longer be identified.

EXAMPLE 5

Thermal Resistance of Mixtures of Battery Electrolytes with Lithium Peroxide

Figure 4:
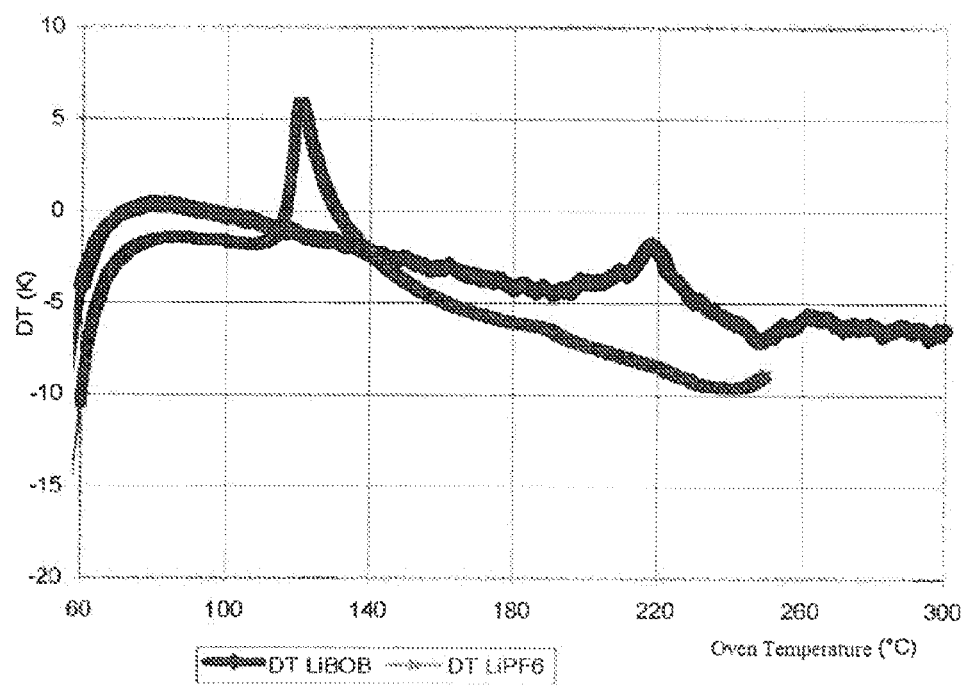
FIG. 4—DSC diagram of thermal electrolyte stability according to example 5

A mixture composed of respectively 0.10 g lithium peroxide (Supplier: Aldrich, content at least 90%) and 2 ml battery liquid electrolytes was filled into a steel autoclave with a capacity of approx. 5 ml with pressure and temperature indicator and heated with a heating rate of 45 K/h to 250 or 300° C. As battery electrolyte a 10% solution of $LiPF_6$ as well as an 11% solution of lithium bis(oxalato) borate (LiBOB) were used in a mixture of ethylene carbonate (EC) and ethylmethyl carbonate (EMC) 1:1 (wt:wt) in FIG. 4.

It can be seen that the $LiPF_6$ electrolyte in the presence of lithium peroxide is stable up to approx. 110° C. but then degrades with marked energy release. However, the LiBOB electrolyte is stable up to approx. 190° C.

The invention claimed is:

1. A rechargeable lithium battery comprising:
   an anode consisting of an oxygen-containing conversion electrode material essentially free from transition metal;
   a transition metal-containing cathode; and
   an aprotic lithium electrolyte;
   wherein in a discharged state the oxygen-containing conversion electrode material is composed of (i) LiOH, or (ii) a mixture of LiOH and at least one member selected from the group consisting of $Li_2O$, $Li_2O_2$, and LiH.

2. The rechargeable lithium battery according to claim 1, wherein the oxygen-containing conversion electrode material in the discharged state is composed of at least one member selected from the group consisting of LiOH and $Li_2O_2$.

3. The rechargeable lithium battery according to claim 1, wherein the oxygen-containing conversion electrode material in a charged state contains LiH.

4. The rechargeable lithium battery according to claim 1, wherein the transition metal-containing cathode comprises a material selected from the group consisting of a lithium insertion material and a conversion material.

5. The rechargeable lithium battery according to claim 4, wherein the lithium insertion material is selected from the group consisting of a lithium metal oxide, a lithiated phosphate, a lithiated silicate and a mixed lithiated fluorometal oxide.

6. The rechargeable lithium battery according to claim 4, wherein the conversion material is selected from the group consisting of a transition metal fluoride and a transition metal oxyfluoride.

7. The rechargeable lithium battery according to claim 6, wherein the conversion material is selected from the group consisting of $NiF_2$, $CoF_2$, $FeF_2$, $FeF_3$ and FeOF.

8. The rechargeable lithium battery according to claim 1, wherein the anode has a molar ratio of $LiOH:Li_2O:Li_2O_2$:LiH in a range between 1:0:0:0 and 1:0.1-2:0.1-2:0.1-12.

9. The rechargeable lithium battery according to claim 1, wherein the oxygen-containing conversion electrode material in the discharged state is composed of LiOH and $Li_2O_2$.

* * * * *